(No Model.)

R. OERLEIN.
COMBINED FOLDING RULE AND TRY SQUARE.

No. 453,890. Patented June 9, 1891.

WITNESSES:
Helmette Holtz
Pucy D. Parker

INVENTOR
Robert Oerlein
BY
W. R. Stringfellow
ATTORNEY

UNITED STATES PATENT OFFICE.

ROBERT OERLEIN, OF NEW ORLEANS, LOUISIANA.

COMBINED FOLDING RULE AND TRY-SQUARE.

SPECIFICATION forming part of Letters Patent No. 453,890, dated June 9, 1891.

Application filed August 14, 1888. Serial No. 282,742. (No model.)

*To all whom it may concern:*

Be it known that I, ROBERT OERLEIN, a citizen of the United States, residing at New Orleans, in the parish of Orleans and State of Louisiana, have invented certain new and useful Improvements in a Try-Square on a Foot-Rule; and I do declare the following to be a full, clear, and exact description of the invention, such as will enable others skilled in the art to which it appertains to make and use the same.

My invention relates to improvements in a foot-rule, in which an arm is made to operate in conjunction with a foot-rule and form a try-square; and the objects of my improvements are to provide an attachment for a foot-rule that will enable a try-square and foot-rule to be constructed as one device. I attain these objects by the mechanism illustrated in the accompanying drawings, in which—

Figure 1:
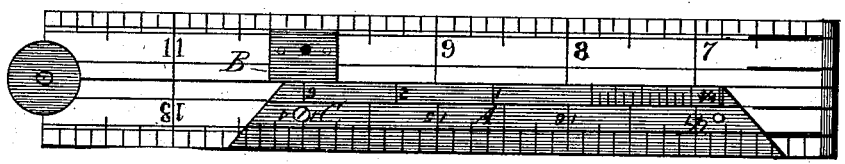
Figure 2:
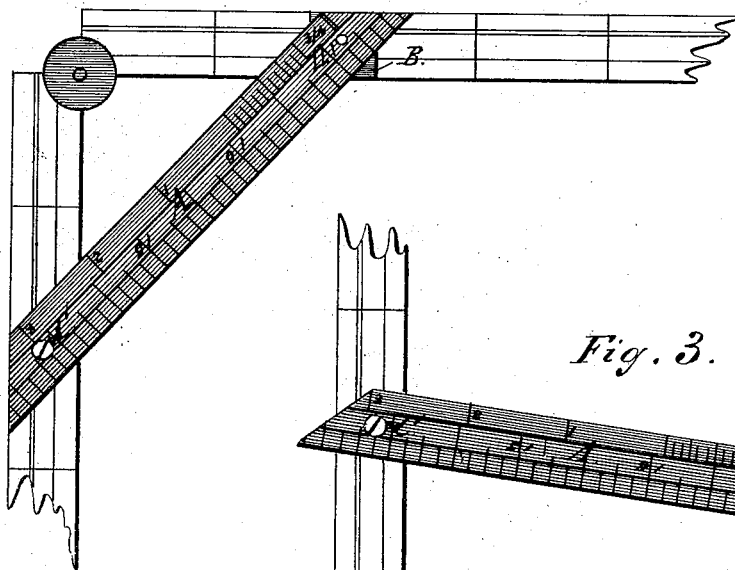
Figure 3:
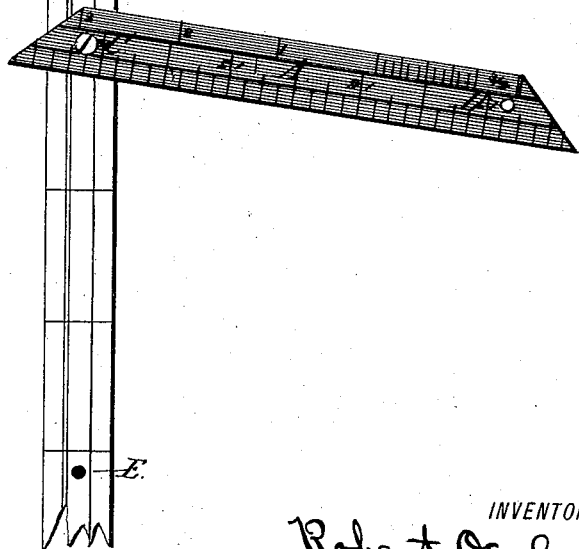

Figure 1 is a top view showing arm which forms a try-square on foot-rule in a closed position. Fig. 2 is a side view showing arm which forms a try-square on foot-rule in an open position. Fig. 3 is a side view showing arm detached at one end and swung from foot-rule.

Similar letters refer to similar parts throughout the several views.

In constructing my device I take an ordinary foot-rule, as shown in Fig. 1; and adjust an arm, as shown by A. This arm may be of any desired material, but preferably of polished steel, so as to render it flexible, and at the same time ornamental. At C, I place a screw through end of arm A, which acts as an axle and permits arm A to be freely opened and closed. At D, I place a rivet, which is securely adjusted to arm A and protrudes beyond the under surface of arm, and when arm is in a closed position, as shown in Fig. 1, rests within opening E and is held in position.

B is a metal shoe placed upon foot-rule, as shown in Fig. 1, with opening in same, and within which rivet D rests when arm is in use with foot-rule as a try-square, as shown in Fig. 2.

Arm A may be numbered or graduated on top of same, so as to correspond with numbers on foot-rule when closed, thus permitting of the same width as the section of the rule to which it is attached without destroying the efficiency of the rule as a measure, and thereby forming an attachment for a foot-rule at a moderate expense, and combining both foot-rule and try-square in one device.

In operating my device I simply raise arm A at a point in close proximity to rivet D, which releases the arm at one end, as shown in Fig. 3. I then open the foot-rule and adjust rivet D in the opening in shoe B, thus forming a try-square, as shown by Fig. 2. A striking advantage of my device is that it can be readily carried in the pocket, thus forming a folding try-square that is at all times accessible and can be put in use at a moment's notice.

It will be observed that the arm A is cut obliquely at its opposite ends, and is graduated, so that the line to be drawn may be measured. By having the opposite ends of this bar A cut obliquely, as shown, it will be seen that the said oblique ends, when the branches of the rule have been fixed in an angular position, will offer no obstruction to the pencil or drawing-instrument, as the said ends meet flush with the outer sides of the rule.

Having fully described my invention, what I claim, and desire to secure by Letters Patent, is—

1. The combination, with a graduated rule, of the shoe B, secured to one of the hinged sections and having an aperture therein, the flexible arm A, pivoted at one end to one branch of the rule and carrying a stud at its opposite end to enter the perforation in the shoe B, said arm having its ends cut obliquely in opposite directions, so as to be flush with the outer edge of the rule when the branches are fixed at right angles to each other, and the upper face of the arm graduated to correspond with the graduations on the rule, whereby an uninterrupted scale may be formed, substantially as specified.

2. A hinged measuring-rule, in combination with an arm having its opposite ends beveled obliquely in opposite directions, and its upper side graduated to correspond with the graduations on the rule-branch to which it is pivoted, substantially as specified.

In testimony whereof I affix my signature in presence of two witnesses.

ROBERT OERLEIN.

Witnesses:
 HENRY J. RHODES,
 PERCY D. PARKS.